(12) United States Patent
Da Silva et al.

(10) Patent No.: US 11,516,748 B2
(45) Date of Patent: *Nov. 29, 2022

(54) TRANSMIT POWER CONTROL

(71) Applicant: Intel Corporation, Santa Clara, CA (US)

(72) Inventors: Claudio Da Silva, Portland, OR (US); Cheng Chen, Portland, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/168,039

(22) Filed: Feb. 4, 2021

(65) Prior Publication Data

US 2021/0160788 A1 May 27, 2021

Related U.S. Application Data

(63) Continuation of application No. 16/145,845, filed on Sep. 28, 2018, now Pat. No. 11,039,402.

(60) Provisional application No. 62/682,318, filed on Jun. 8, 2018.

(51) Int. Cl.
| | |
|---|---|
| *H04W 52/24* | (2009.01) |
| *H04W 24/10* | (2009.01) |
| *H04B 17/336* | (2015.01) |
| *H04W 72/04* | (2009.01) |
| *H04L 1/00* | (2006.01) |
| *G06F 9/54* | (2006.01) |
| *G06F 13/28* | (2006.01) |
| *H04L 49/90* | (2022.01) |
| *H04W 52/36* | (2009.01) |
| *H04W 52/42* | (2009.01) |
| *H04B 7/0413* | (2017.01) |

(52) U.S. Cl.
CPC ......... *H04W 52/241* (2013.01); *G06F 9/544* (2013.01); *G06F 13/28* (2013.01); *H04B 17/336* (2015.01); *H04L 1/0003* (2013.01); *H04L 1/0031* (2013.01); *H04L 49/9021* (2013.01); *H04W 24/10* (2013.01); *H04W 52/367* (2013.01); *H04W 52/42* (2013.01); *H04W 72/0446* (2013.01); *H04W 72/0473* (2013.01); *H04B 7/0413* (2013.01); *H04L 1/0026* (2013.01)

(58) Field of Classification Search
None
See application file for complete search history.

(56) References Cited

U.S. PATENT DOCUMENTS

| | | | |
|---|---|---|---|
| 11,039,402 B2 * | 6/2021 | Da Silva | H04W 52/262 |
| 2014/0029453 A1 * | 1/2014 | Trainin | H04W 24/10 370/252 |

(Continued)

*Primary Examiner* — Anh Vu H Ly
(74) *Attorney, Agent, or Firm* — Eversheds Sutherland (US) LLP

(57) ABSTRACT

This disclosure describes systems, methods, and devices related to transmit power control (TPC). A device may identify a link measurement request frame from a first station device. The device may determine, for each transmit chain of the first station device, a TPC action to be performed by the first device. The device may cause to send a link measurement report frame comprising a value indicative of the TPC action for each transmit chain. The device may identify an acknowledgement from the first station device.

20 Claims, 12 Drawing Sheets

(56) References Cited

U.S. PATENT DOCUMENTS

| | | | |
|---|---|---|---|
| 2015/0319700 A1* | 11/2015 | Oteri | H04W 52/28 |
| | | | 455/127.1 |
| 2019/0268972 A1* | 8/2019 | Chen | H04L 1/1614 |
| 2019/0297518 A1* | 9/2019 | Chen | H04W 72/04 |
| 2019/0373537 A1* | 12/2019 | Trainin | H04B 17/309 |
| 2020/0359461 A1* | 11/2020 | Chen | H04W 24/10 |

* cited by examiner

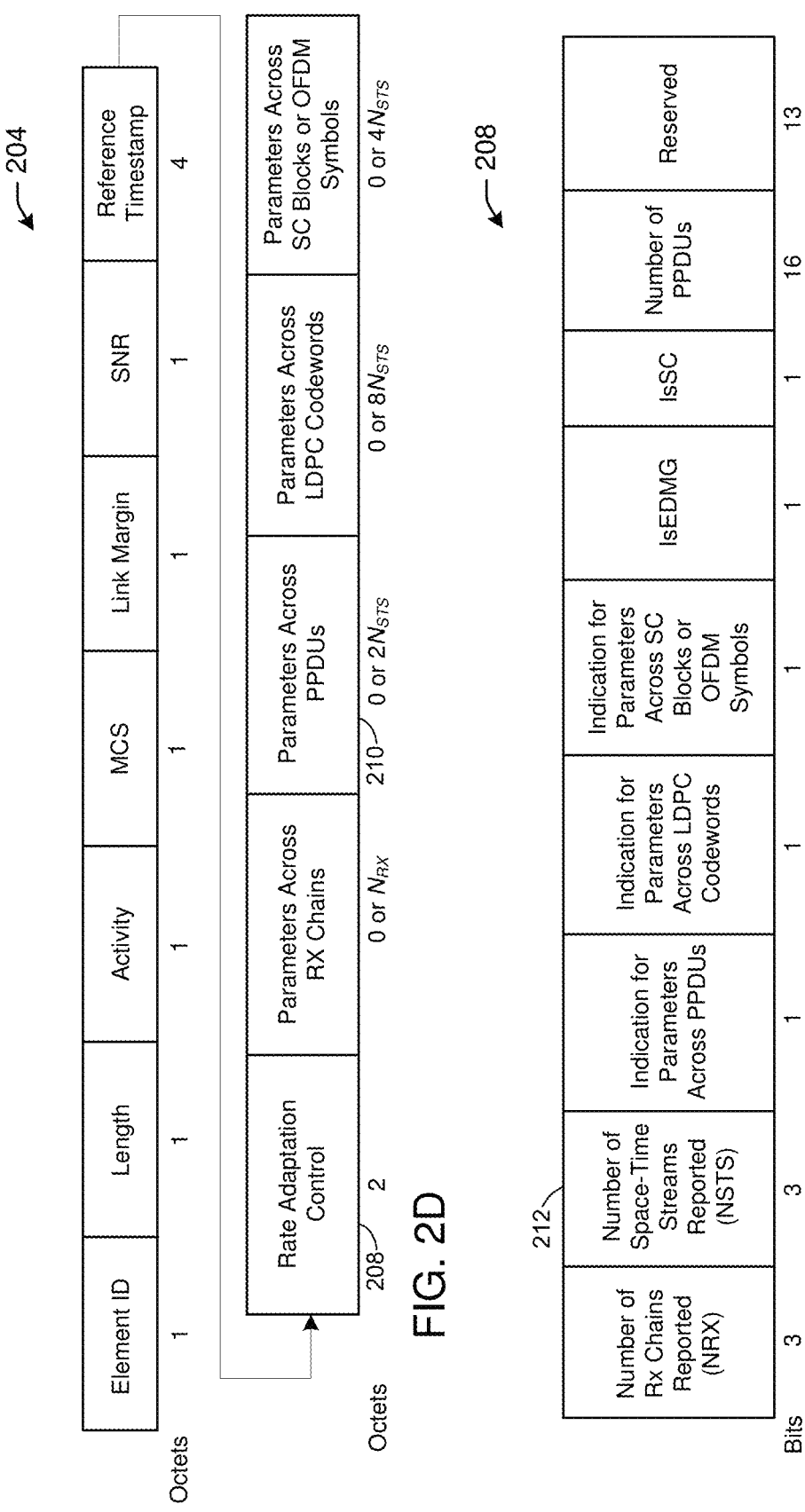

FIG. 3C

Element 303:

| Element ID | Length | Rate Adaptation Control/MIMO TPC | Activity | MCS | Link Margin | SNR | Reference Timestamp |
|---|---|---|---|---|---|---|---|
| 1 | 1 | 2 | 1 | 1 | 1 | 1 | 4 |

Octets

Element 304:

| Parameters Across RX Chains | Parameters Across PPDUs | Parameters Across LDPC Codewords | Parameters Across SC Blocks or OFDM Symbols | MIMO TPC |
|---|---|---|---|---|
| 0 or $N_{RX}$ | 0 or $2N_{STS}$ | 0 or $8N_{STS}$ | 0 or $4N_{STS}$ | 0 or $2N_{STS}$ |

305 / 306 / 307 / 308

Octets

FIG. 3D

Element 304 / 310:

| Number of Rx Chains Reported (NRX) | Number of Space-Time Streams Reported (NSTS) | Indication for Parameters Across PPDUs | Indication for Parameters Across LDPC Codewords | Indication for Parameters Across SC Blocks or OFDM Symbols | IsEDMG | IsSC | Number of PPDUs | Indication for MIMO TPC | Reserved |
|---|---|---|---|---|---|---|---|---|---|
| 3 | 3 | 1 | 1 | 1 | 1 | 1 | 16 | 1 | 12 |

Bits

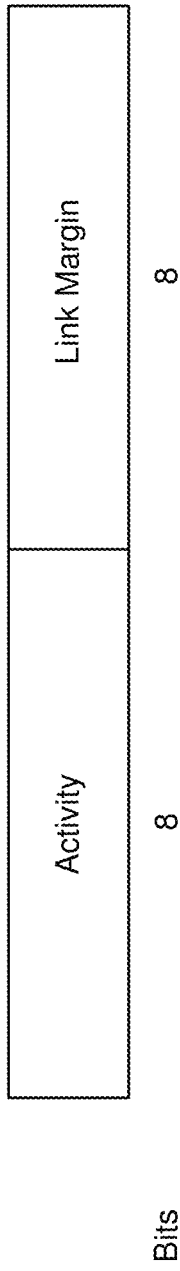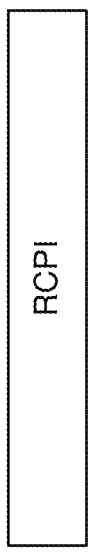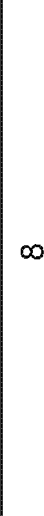
FIG. 3E
FIG. 3F
FIG. 3G

TRANSMIT POWER CONTROL

CROSS REFERENCE TO RELATED APPLICATION(S)

This application is a Continuation of U.S. non-provisional application Ser. No. 16/145,845, filed Sep. 28, 2018, which claims the benefit of U.S. Provisional Application No. 62/682,318, filed Jun. 8, 2018, both disclosures of which is incorporated herein by reference as if set forth in full.

TECHNICAL FIELD

This disclosure generally relates to systems and methods for wireless communications and, more particularly, to transmit power control.

BACKGROUND

Wireless devices are becoming widely prevalent and are increasingly requesting access to wireless channels. The growing density of wireless deployments requires increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

BRIEF DESCRIPTION OF THE DRAWINGS

FIGS. 2A-2G depict illustrative schematic diagrams for transmit power control.

FIGS. 3A-3I depict illustrative schematic diagrams for transmit power control, in accordance with one or more example embodiments of the present disclosure.

DETAILED DESCRIPTION

Figure 1:
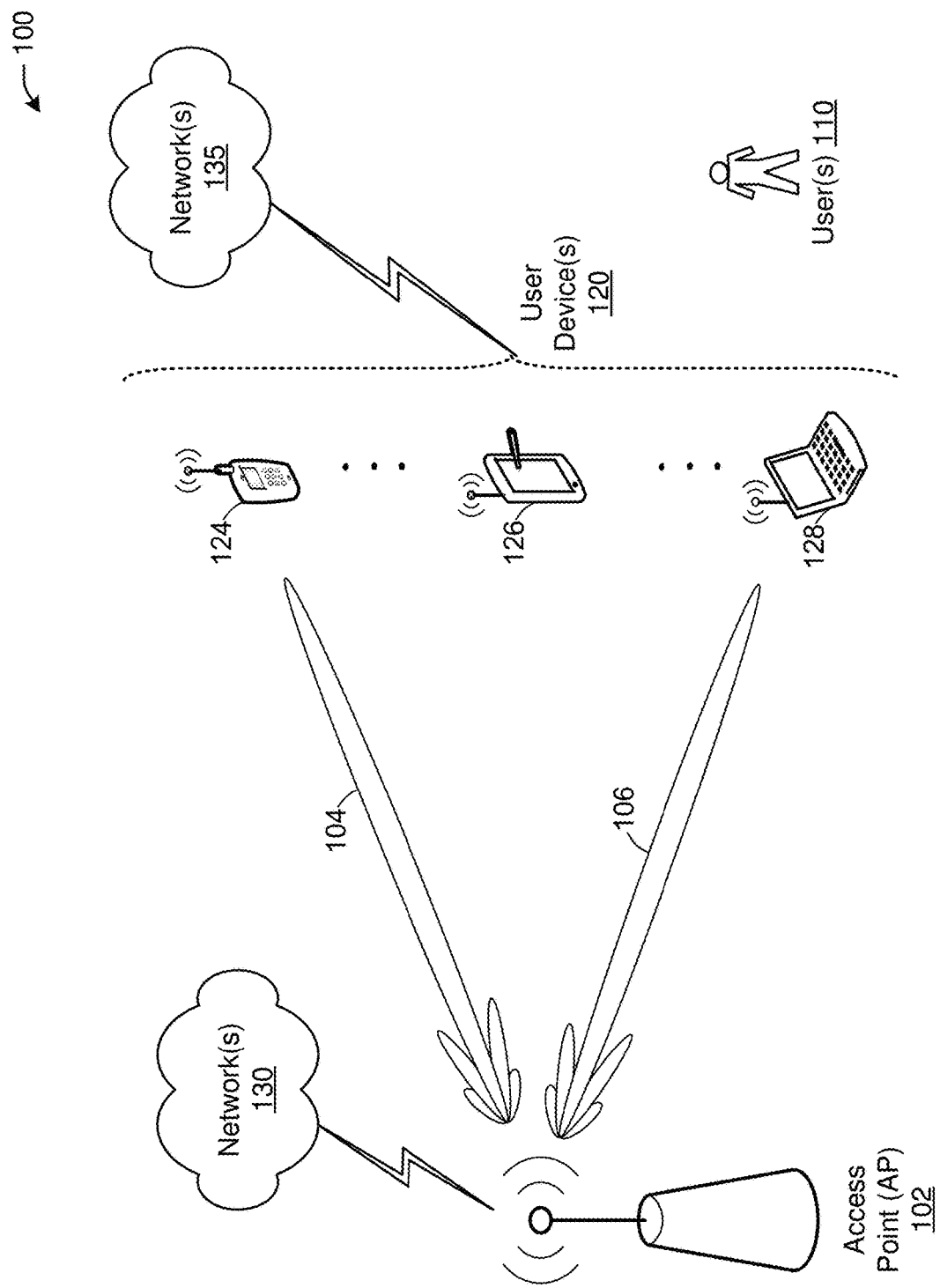
FIG. 1 depicts a network diagram illustrating an example network environment for transmit power control (TPC), in accordance with one or more example embodiments of the present disclosure.

Example embodiments described herein provide certain systems, methods, and devices for transmit power control (TPC) for enhanced directional multi-gigabit (EDMG) multiple input, multiple output (MIMO) transmissions.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an EDMG network, and/or any other network. Devices operating in EDMG may be referred to herein as EDMG devices. This may include user devices and/or access points (APs) or other devices capable of communicating in accordance with a communication standard.

One or more devices may be configured to communicate over a next generation 60 GHz (NG60) network, an EDMG network, and/or any other network. For example, the one or more devices may be configured to communicate over the NG60 or EDMG networks.

A directional multi-gigabyte (DMG) communications system may involve one or more directional links to communicate at a rate of multiple gigabits per second, for example, at least 1 gigabit per second, 7 gigabits per second, or any other rate. An amendment to a DMG operation in a 60 GHz band, e.g., according to an Institute of Electrical and Electronics Engineers (IEEE) 802.11ad standard, may be defined, for example, by an IEEE 802.11ay project.

One of the key technical advances made in IEEE 802.11ay with respect to IEEE 802.11ad is the definition of MIMO transmission, including single user MIMO (SU-MIMO) and downlink multi-user MIMO (MU-MIMO). TPC refers to operations that adjust one or more transmitter power parameters of a STA in order to improve system performance (e.g., by reducing interference with a neighboring wireless network). A STA may perform TPC any time during data transmission, for example in response to an indication that conditions have changed, during beamforming training, and/or to reduce interference to other STAs. However, the current 802.11ay draft does not define required signaling necessary to support TPC for MIMO transmissions.

To perform TPC in IEEE 802.11ad systems, a station device (STA) (e.g., a peer STA) may use a Link Measurement Request frame to request another STA to respond with a Link Measurement Report frame that includes TPC-related information. TPC-related information may include information related to one or more of link margin, transmit power, modulation and coding scheme (MCS), a signal-to-noise ratio, and an activity that is recommended for the peer STA to perform. The phrase "link margin" refers to a ratio of the received signal power to the minimum required by the STA. The receiving STA (e.g., the STA that receives the Link Measurement Request frame) may respond with the Link Measurement Report frame, which may include a recommendation for the peer STA to perform one or more TPC actions, including, for example, increasing or decreasing a transmit power and/or modifying an MCS.

To support TPC, the Link Measurement Report frame may include link margin and transmit power information, which may be sent within the TPC Report element within the Link Measurement Report frame. The Link Measurement Report frame may also include one or more fields corresponding to MCS, link margin, SNR, and/or activity (e.g., a preferred action that the STA sending this element recommends that the peer STA execute), which are sent within the DMG Link Margin element of the Link Measurement Report frame.

Acknowledgement of TPC-related operations may be performed by using the DMG Link Adaptation Acknowledgement in the Link Measurement Report frame.

As noted above, the current frames and elements defined in 802.11ad and 802.11ay do not allow for TPC of multiple "links" (e.g., space-time streams) as necessary in EDMG MIMO transmissions when spatial multiplexing is performed.

Because of these deficiencies, it is desired to create a mechanism that allows a STA to report the link margin and the TPC activity of each space-time stream.

Example embodiments of the present disclosure relate to systems, methods, and devices for TPC for EDMG MIMO transmissions.

In one or more embodiments, a transmit power control system may define new signaling required to support TPC for MIMO transmissions in IEEE 802.11ay. The transmit power control system may include the signaling required for both the request and response of MIMO TPC-related information, as well as to acknowledge TPC operations.

In one or more embodiments, a transmit power control system may modify the action field of the Link Measurement Request frame. For example, a modified Link Measurement Request frame may include a new element, such as a DMG Link Measurement Request element. The DMG Link Measurement Request element may have a length of 2 bytes times a number of transmit chains. The DMG Link Measurement Request element may be used to indicate the transmit power used and the maximum transmit power of each transmit chain. This element may be repeated once for each transmit chain.

In one or more embodiments, a transmit power control system may modify the DMG Link Margin element of the Link Measurement Report frame. One or more aspects of the transmit power control system may be based on appropriate extensions to existing signaling, including the directional multi-gigabit (DMG) Link Margin element. For example, the definition of the Rate Adaptation Control field of the DMG Link Margin element may be modified by adding a bit used to indicate that the DMG Link Margin element includes MIMO TPC-related information.

In one or more embodiments, a transmit power control system may include a DMG Link Margin element with a new field added that may be used to report SNR and MCS per space-time stream. For example, the new field within the DMG Link Margin element may be termed "MIMO TPC" and may have a length of bytes times a number of space-time streams in the MIMO transmission. The MIMO TPC field may be repeated for each space-time stream. The MIMO TPC field may allow for a STA to report the link margin and activity of each space-time stream.

In one or more embodiments, a transmit power control system may include a MIMO TPC Link Adaptation Acknowledgement field in a DMG Link Adaptation Acknowledgement element. The DMG Link Adaptation Acknowledgement element may include a number of MIMO TPC Link Adaptation Acknowledgement fields that is equal to a number of space-time streams.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for transmit power control, in accordance with one or more example embodiments of the present disclosure.

Wireless network 100 may include one or more user device(s) 120 and one or more access point(s) (AP) 102, which may communicate in accordance with IEEE 802.11 communication standards, such as IEEE 802.11ay, IEEE 802.11ad, millimeter-wave, and WiGig specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 5:
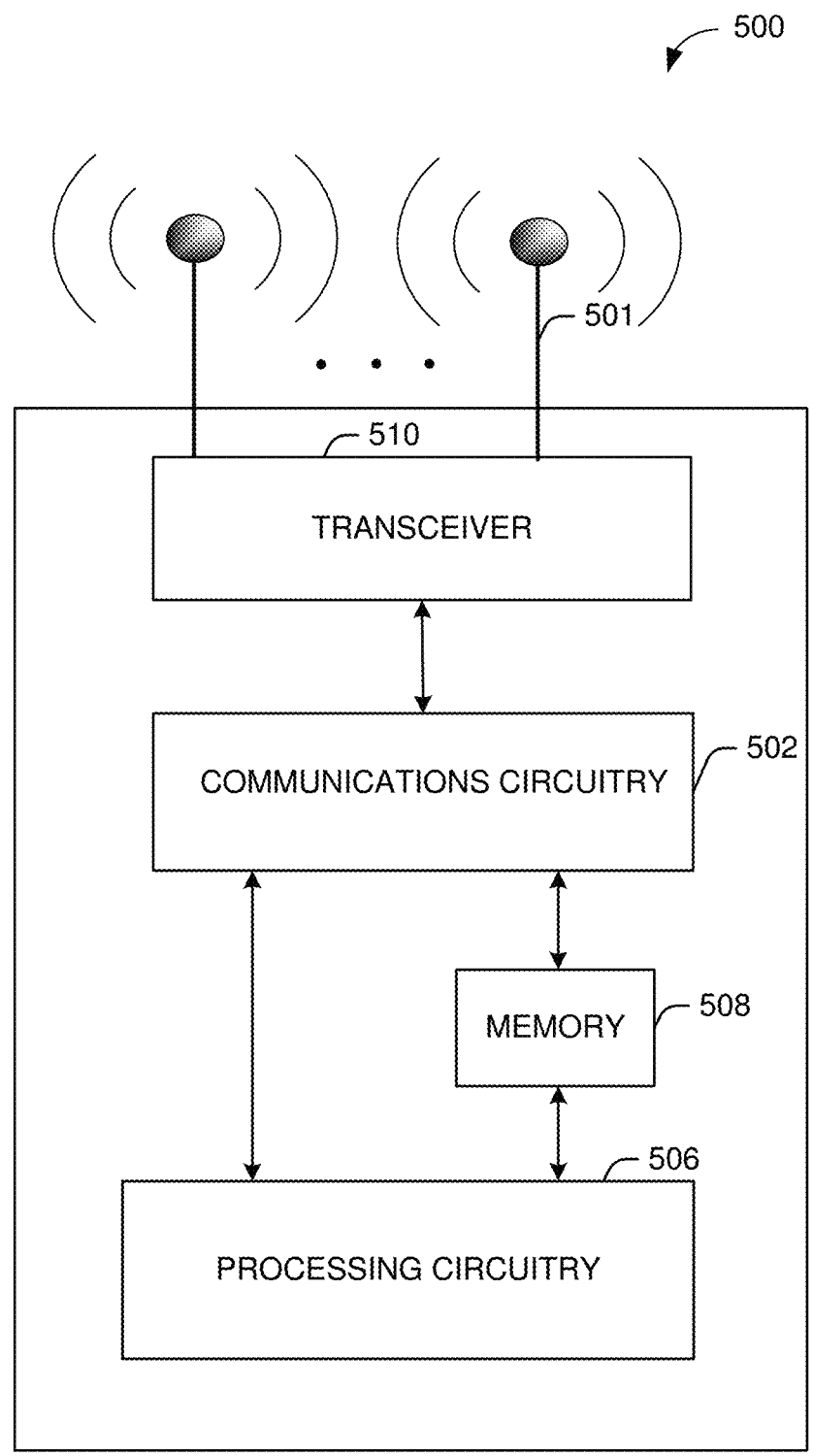
FIG. 5 illustrates a functional diagram of an example communication station that may be suitable for use as a user device, in accordance with one or more example embodiments of the present disclosure.
Figure 6:
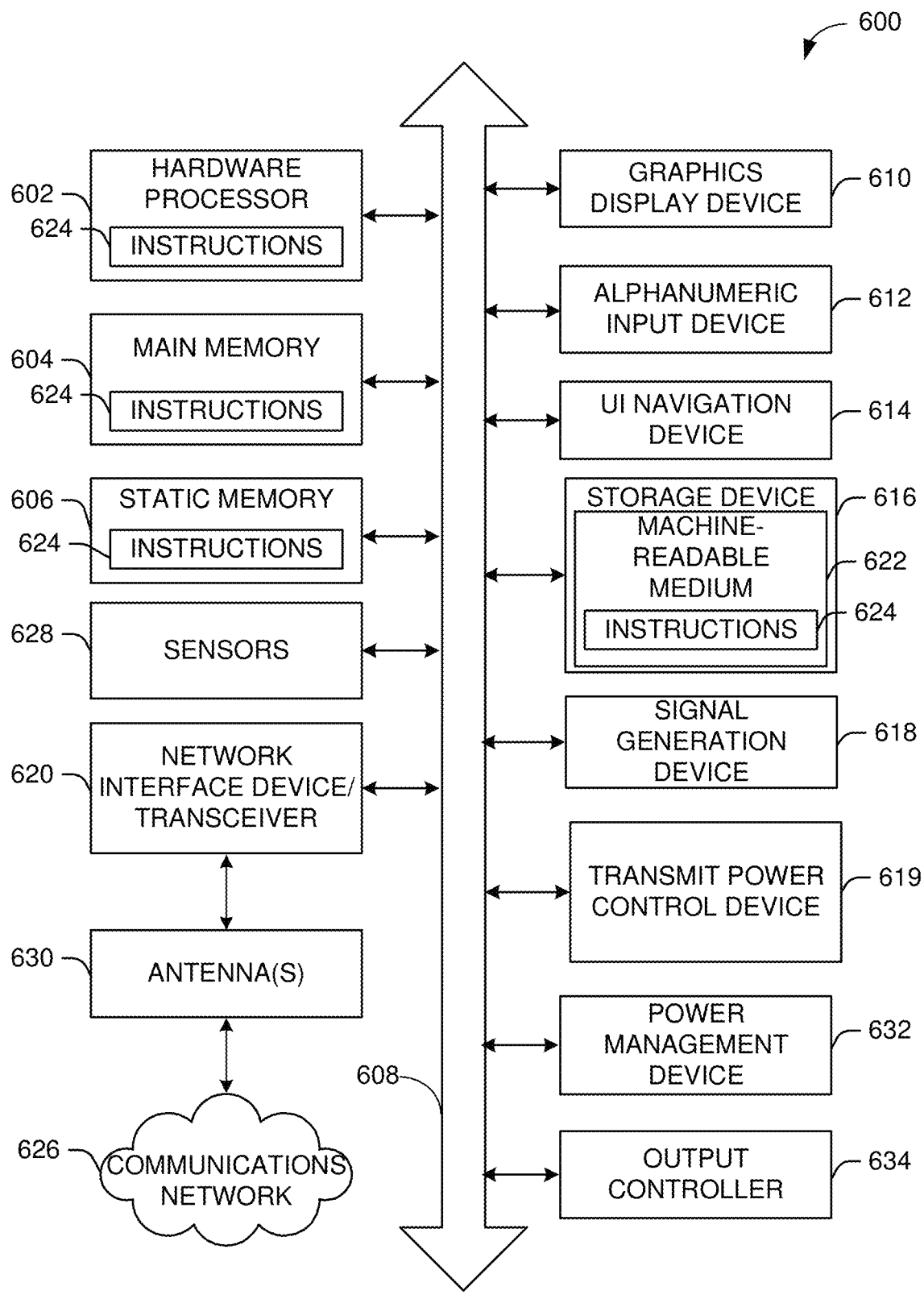
FIG. 6 illustrates a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 5 and/or the example machine/system of FIG. 6.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically compassable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc., may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP 102 may include one or more communications antennas. The one or more communications antennas may be any suitable type of antennas corresponding to the communications protocols used by the user device(s) 120 (e.g., user devices 124, 126 and 128) and AP 102. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128) and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128) and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using radio frequency (RF) beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving RF signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)," as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single AP together with all associated stations (STAs) is called a BSS.

In some demonstrative embodiments, the user device(s) 120 and/or AP 102 may be configured to support one or more mechanisms and/or features, for example, channel bonding, SU MIMO, and/or MU MIMO, for example, in accordance with an EDMG Standard, an IEEE 802.11ay standard and/or any other standard and/or protocol.

In one embodiment, and with reference to FIG. 1, an initiator (e.g., AP 102) may be configured to communicate with one or more responders (e.g., non-AP STAs, such as, user devices 120).

For example, in order for the AP 102 to establish communication with two devices (e.g., user device 124 and user device 128), the AP 102 may need to perform beamforming training with the user device 124 and the user device 128 using beams 104 and 106. The AP 102 may transmit one or more sector sweep (SSW) frames over different antenna sectors defined by the one providing high signal quality between the AP 102 and the user device 124 and the user device 128. However, the SSW frames may reach the user device 126. It is understood that the above descriptions are for purposes of illustration and are not meant to be limiting.

FIGS. 2A-2G depict illustrative schematic diagrams for transmit power control (TPC).

TPC refers to operations that adjust one or more transmitter power parameters in order to improve system performance (e.g., by reducing interference with a neighboring wireless network). A STA may perform TPC any time during data transmission, for example in response to an indication that conditions have changed, during beamforming training, and/or to reduce interference to other STAs. In response to receiving a Link Measurement Request frame from a peer STA, a STA may respond with a Link Measurement Report frame that includes an indication of an action that the STA recommends be performed by the peer STA, including modify a MCS, increase or decrease a transmit power, perform fast session transfer (FST), enter power conservation mode, or perform a sector-level sweep (SLS).

Figure 2A:
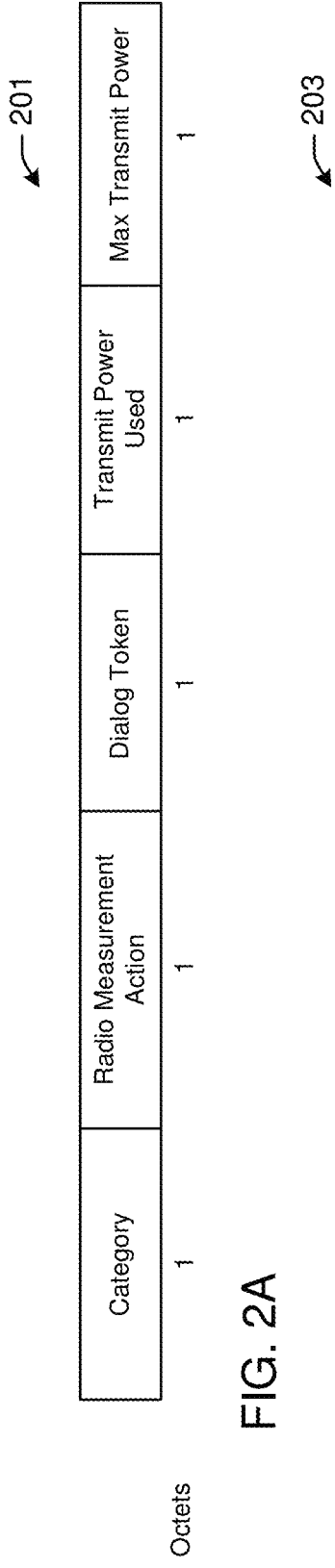

FIG. 2A depicts an illustrative schematic diagram for a Link Measurement Request frame 201 Action field format.

To perform TPC in IEEE 802.11ad systems, a STA may use a Link Measurement Request frame 201 to request another STA to respond with a Link Measurement Report frame that includes TPC-related information. The Link Measurement Request frame 201 may include a Category element, a Radio Measurement Action element, a Dialog Token element, a Transmit Power Used element, and a Max Transmit Power element.

Figure 2B:
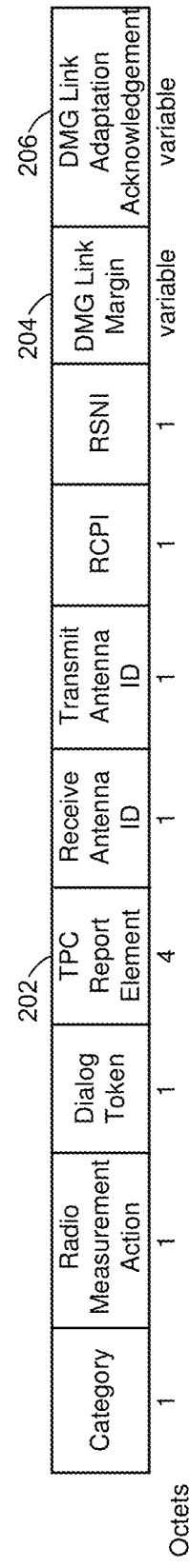

FIG. 2B depicts an illustrative schematic diagram for a Link Measurement Report frame 203 Action field format. A STA (e.g., a STA that has received a Link Measurement Request frame 201 from a peer STA) may respond to the peer STA with the Link Measurement Report frame 203. The Link Measurement Report frame 203 may include a Category element, a Radio Measurement Action element, a Dialog Token element, a TPC Report element 202, a Receive Antenna ID element, a Transmit Antenna ID element, a Received Channel Power Indicator (RCPI) element, a Received Signal-to-Noise Indicator (RSNI) element, a DMG Link Margin element 204, and a DMG Link Adaptation Acknowledgement element 206.

Figure 2C:
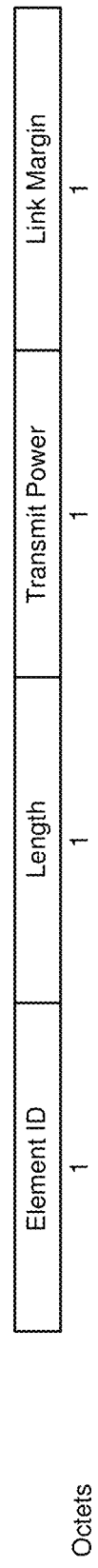

FIG. 2C depicts an illustrative schematic diagram for a TPC Report element 202 format. To support TPC, the Link Measurement Report frame 203 may include the TPC Report element 202 and the DMG Link Margin element 204. The TPC Report element 202 may include an Element ID field, a Length field, a Transmit Power field, and a Link Margin field.

FIG. 2D depicts an illustrative schematic diagram for a DMG Link Margin element 204 format. The DMG Link Margin element 204 may include an Element ID field, a Length field, an Activity field, an MCS field, a Link Margin field, a Signal to Noise Ratio (SNR) field, a Reference Timestamp field, a Rate Adaptation Control field 208, a Parameters Across RX Chains field, a Parameters Across PPDUs field 210, a Parameters Across LDPC Codewords field, and a Parameters Across SC Blocks or OFDM Symbols field.

FIG. 2E depicts an illustrative schematic diagram for a Rate Adaptation Control field 208 format. The Rate Adaptation Control field 208 within the DMG Link Margin element 204 may include bits that correspond to a Number of Rx Chains Reported (NRX), a Number of Space-Times Streams Reported (NSTS) 212, an Indication for Parameters Across PPDUs, an Indication for Parameters Across LDPC Codewords, an Indication for Parameters Across SC Blocks or OFDM Symbols, an IsEDMG, an IsSC, a Number of PPDUs, and Reserved.

Figure 2F:
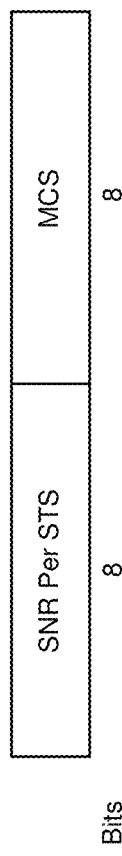

FIG. 2F depicts an illustrative schematic diagram for a Parameters Across PPDUs field 210 format. The Parameters Across PPDU field 210 within the DMG Link Margin element 204 may include bits that correspond to an SNR Per STS and an MCS.

Figure 2G:
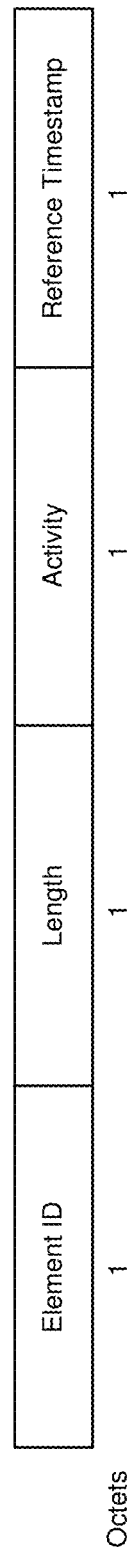

FIG. 2G depicts an illustrative schematic diagram for a DMG Link Adaptation Acknowledgement element 206 format. To support TPC, the Link Measurement Report frame 203 may include the DMG Link Adaptation Acknowledgement element 206. The DMG Link Adaptation Acknowledgement element 206 may include an Element ID field, a Length field, an Activity field, and a Reference Timestamp field. In some embodiment, the DMG Link Adaptation Acknowledgement element 206 allows for the acknowledgement of the action that the STA sending this element has executed following the reception of the recommended activity in a Link Measurement Report frame 203.

As seen in FIGS. 2A-2G, the current frames and elements do not allow for TPC of multiple "links" (e.g., space-time streams), as necessary in EDMG MIMO transmissions when spatial multiplexing is performed.

In one or more embodiments, it is still necessary to create a mechanism that allows a STA to report the link margin and the TPC activity of each space-time stream.

In one embodiment, a transmit power control system may define new signaling required to support TPC for MIMO transmissions in IEEE 802.11ay. The transmit power control system may include the signaling required for both the request and response of MIMO TPC-related information, as well as to acknowledge TPC operations.

Figure 3A:
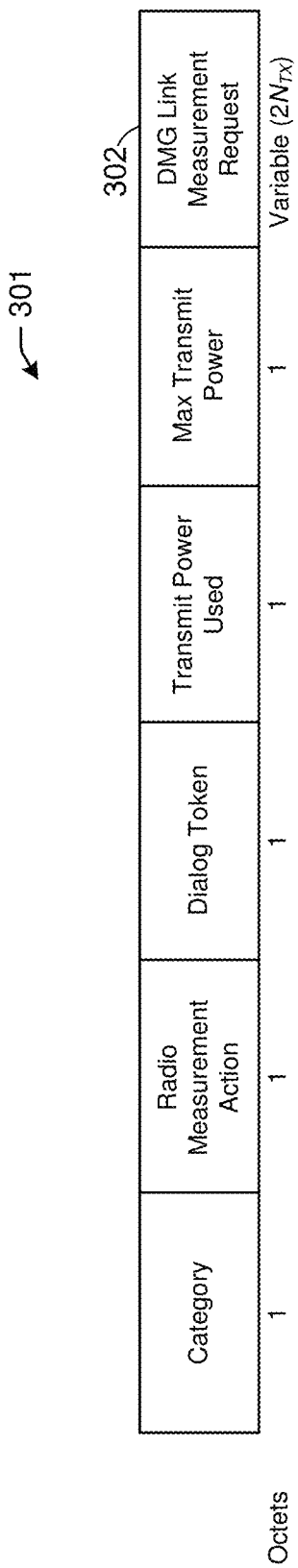

FIG. 3A depicts an illustrative modified Link Measurement Request frame 301 Action field format, in accordance with one or more example embodiments of the present disclosure. In IEEE 802.11ay, digital beamforming is optional. If MIMO is performed using analog beamforming only, it may be useful for the STA receiving the Link Measurement Request frame 301 to know the transmit power used and the maximum transmit power of each transmit chain.

Thus, a transmit power control system may facilitate modifying the Action field of the Link Measurement Request frame 301, and may include a new DMG Link Measurement Request element 302 within it, with length of 2 $N_{TX}$, which is used to indicate the transmit power used and the maximum transmit power of each transmit chain. This new element may be repeated $N_{TX}$ times.

A transmit power control system may modify the Action field of the Link Measurement Request frame 301. For example, a modified Link Measurement Request frame 301 may include a new element, such as a DMG Link Measurement Request element 302. The DMG Link Measurement Request element 302 may have a length of 2 bytes times a number of transmit chains. The DMG Link Measurement Request element 302 may be used to indicate the transmit power used and the maximum transmit power of each transmit chain. This element may be repeated once for each transmit chain.

Figure 3B:
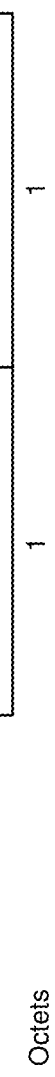

FIG. 3B depicts an illustrative modified DMG Link Measurement Request element 302, in accordance with one or more example embodiments of the present disclosure. The DMG Link Measurement Request element 302 may have an octet to indicate a transmit power used and an octet to indicate a maximum transmit power for each transmit chain of the station device that is sending the Link Measurement Request frame 301.

FIG. 3C depicts an illustrative modified DMG Link Margin element 303, in accordance with one or more example embodiments of the present disclosure. In one or more embodiments, a transmit power control system may modify the DMG Link Margin element 303 of a Link Measurement Report frame (e.g., Link Measurement Report frame 203 of FIG. 2B). One or more aspects of the transmit power control system may be based on appropriate extensions to existing signaling, including the DMG Link Margin element 303. For example, the definition of the Rate Adaptation Control/MIMO TPC field 304 of the DMG Link Margin element 303 may be modified by adding a MIMO TPC field (e.g., modified as compared to Rate Adaptation Control field 208 of FIG. 2D-2E), which may be used to indicate that the DMG Link Margin element 303 includes MIMO TPC-related information.

FIG. 3D depicts an illustrative modified Rate Adaptation Control/MIMO TPC field 304 format, in accordance with one or more example embodiments of the present disclosure. The modified Rate Adaptation Control/MIMO TPC field 304 of DMG Link Margin element 303 may be modified to include a bit that corresponds to Indication for MIMO TPC 310. The Indication for MIMO TPC bit 310 may indicate that the DMG Link Margin element 303 includes MIMO-related information.

FIG. 3E depicts an illustrative MIMO TPC field 308 format, in accordance with one or more example embodiments of the present disclosure. The MIMO TPC field 308 may be added to DMG Link Margin element 303 of FIG. 3C. The MIMO TPC field 308 may have a length of two bytes times a number of space-time streams. The MIMO TPC field 308 may allow the STA to report the link margin and activity of each space-time stream. A transmit power control system may include a DMG Link Margin element 303 with a new field added that may be used to report SNR and MCS per space-time stream. For example, the new field within the DMG Link Margin element 303 may be termed "MIMO TPC" and may have a length of bytes times a number of space-time streams in the MIMO transmission. The MIMO TPC field 308 may be repeated for each space-time stream. The MIMO TPC field 308 may allow for a STA to report the link margin and activity of each space-time stream.

FIG. 3F depicts an illustrative modified Parameters Across PPDUs field 306 format, in accordance with one or more example embodiments of the present disclosure. In one or more embodiments, a transmit power control system may report the link margin and activity of each space-time stream in an alternate way (as compared to the modified DM Link Margin element discussed with respect to FIGS. 3C-3E. For instance, as opposed to creating a new field (e.g., MIMO TPC field 308) within the DMG Link Margin element 303 to report the link margin and activity of each space-time stream, a transmit power control system may facilitate including the new required information in the Parameters Across PPDUs field 306. In this case, the new Parameters Across PPDUs field 306 may be defined as shown in FIG. 3F. The Parameters Across PPDUs field 306 may be repeated $N_{STS}$ times, e.g. for each space-time stream. The length of the Parameters Across PPDUs field 306 would therefore be equal to four bytes times a number of space-time streams.

FIG. 3G depicts an illustrative modified Parameters Across RX chains field 305 format, in accordance with one or more example embodiments of the present disclosure. In addition to SNR, MCS, link margin, and activity of each space-time stream, there may also be value to TPC for the reporting STA to measure and feedback the RCPI (Received Channel Power Indicator) of each transmit chain-receive chain pair. The Parameters Across RX chains field 305 within the DMG Link Margin element 303 may allow for a STA to report RCPI for each RF chain. In one or more embodiments, to extend the existing element to support MIMO TPC, it may be necessary to define that the measurements must be performed for each transmit chain-receive chain pair. In this case, the format shown in FIG. 3C is still valid; however, the length of the Parameters Across RX Chains 313 field may be changed from $N_{RX}$ (as shown in FIG. 3C) to $N_{RX} \times N_{TX}$.

Figure 3H:
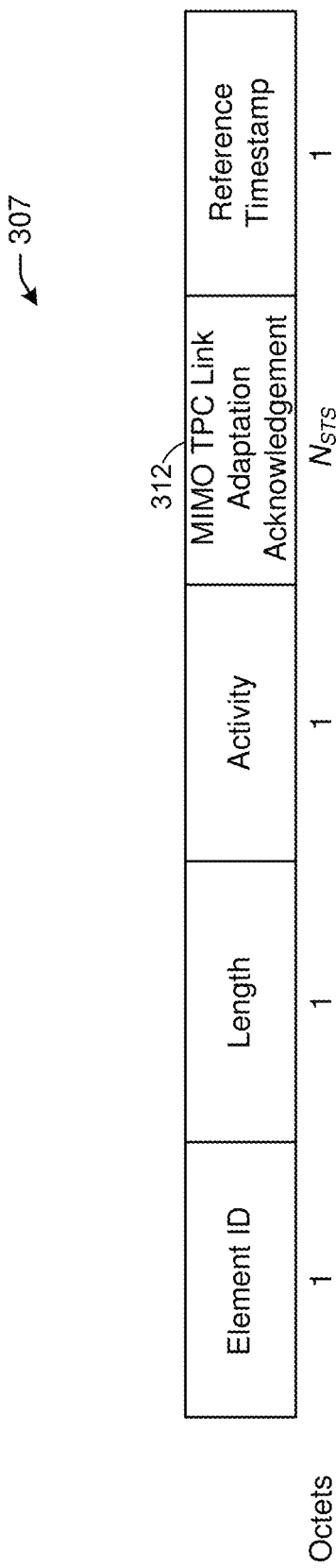
Figure 3I:
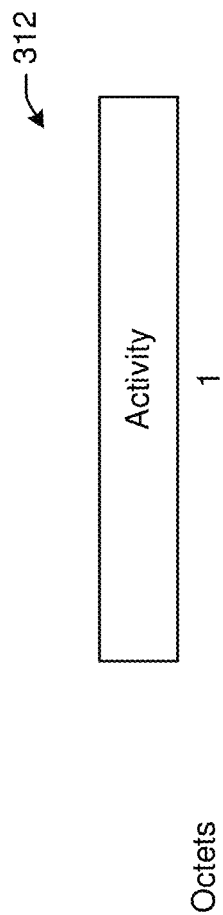

FIG. 3H depicts an illustrative modified DMG Link Adaptation Acknowledgment element 307 format, in accordance with one or more example embodiments of the present disclosure. In one or more embodiments, a transmit power control system may use a modified DMG Link Adaptation Acknowledgement element 307 (e.g., a modified version of DMG Link Adaptation Acknowledgement element 206 of FIG. 2B). The DMG Link Adaptation Acknowledgement element format 307 is shown in FIG. 3H. The Activity field within the element is set to the action that the STA sending this element has executed following the reception of the recommended activity in a Link Measurement Report frame. For the case when the recommended activity in a Link Measurement Report frame includes information on more than one space-time stream, the DMG Link Adaptation Acknowledgement element 315 may include more than one Activity field (e.g., one for each space-time stream). For this reason, the DMG Link Adaptation Acknowledgement element 315 may include MIMO TPC Link Adaptation Acknowledgement field 312, as shown in FIGS. 3H-3I. Specifically, the element may be extended to include $N_{STS}$ activity fields, one per space-time stream.

FIG. 3I depicts an illustrative MIMO TPC Link Adaptation Acknowledgement field 312 format, in accordance with one or more example embodiments of the present disclosure. The MIMO TPC Link Adaptation Acknowledgement field format 312 may correspond to the MIMO TPC Link Adaptation Acknowledgement field 312 illustrated in FIG. 3H.

A second possible way of introducing the necessary modification would be to use the Activity element already defined in the DMG Link Adaptation Acknowledgement element, and define that the MIMO TPC Link Adaptation Acknowledgement field only includes information on links (for example, space-time streams) 2, 3 ... $N_{STS}$ only. In this case, the length of the MIMO TPC Link Adaptation Acknowledgement field 312 would be $2(N_{STS}-1)$.

Figure 4A:
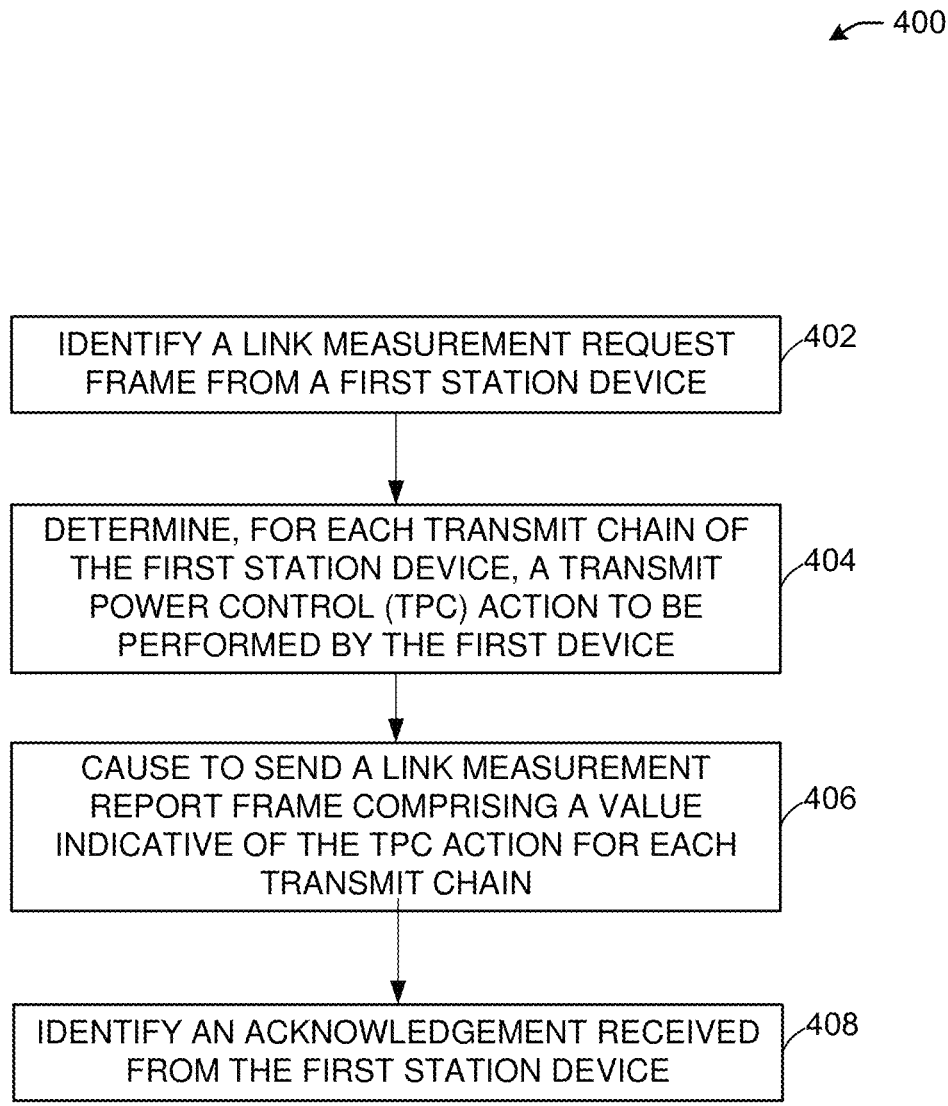
FIGS. 4A-4B illustrate flow diagrams of illustrative processes for an illustrative transmit power control system, in accordance with one or more example embodiments of the present disclosure.
Figure 4B:
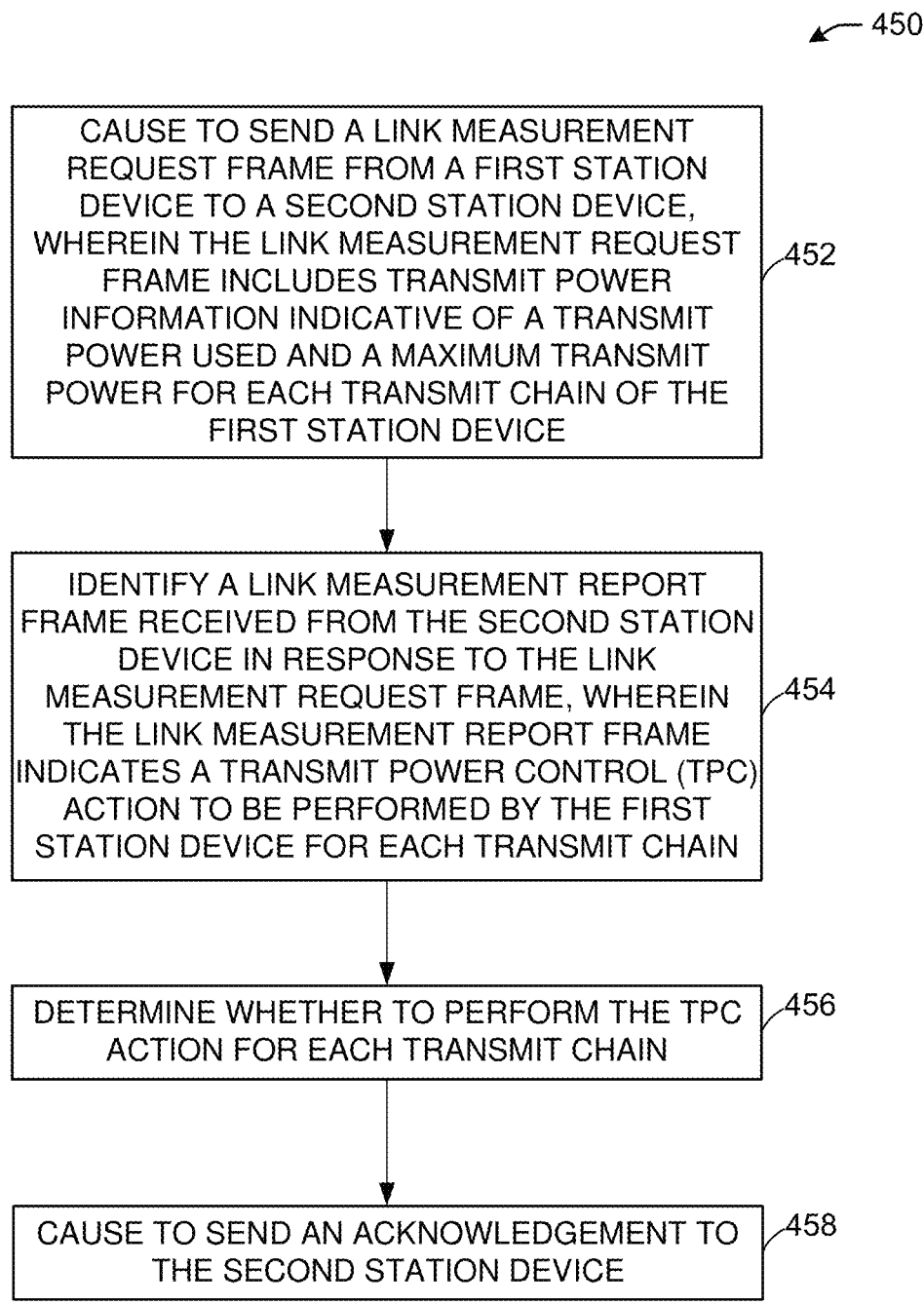

FIGS. 4A-4B illustrate flow diagrams of illustrative process 400 and illustrative process 450 for an illustrative transmit power control system, in accordance with one or more example embodiments of the present disclosure.

FIG. 4A illustrates a flow diagram of illustrative process 400 for an illustrative transmit power control system, in accordance with one or more example embodiments of the present disclosure.

At block 402, a device (e.g., the user device(s) 120 and/or the AP 102 of FIG. 1) may identify a link measurement request frame from a first station device. The device may comprise a transceiver configured to transmit and receive wireless signals. The device may comprise an antenna coupled to the transceiver.

At block 404, the device may determine, for each transmit chain of the first station device, a transmit power control (TPC) action to be performed by the first device. The TPC action may include a modification of a transmit power for the transmit chain or a modification of a modulation and coding scheme (MCS) for the transmit chain. The device may determine a signal to noise ratio (SNR) for each transmit chain.

At block 406, the device may cause to send a link measurement report frame comprising a value indicative of the TPC action for each transmit chain. The link measurement report frame may further comprise a value indicative of the SNR for each transmit chain. The link measurement report frame may include a field with a length equal to two bytes times a number of space-time streams, wherein the value indicative of the TPC action for each transmit chain may be included in the field. The link measurement report frame may include a field that indicates that a directional multi-gigabit (DMG) Link Margin element of the link measurement report includes multiple input, multiple output (MIMO) TPC-related information.

At block 408, the device may identify an acknowledgement received from the first station device. The acknowledgement may include a value that indicates whether the first station device performed the TPC action.

FIG. 4B illustrates a flow diagram of illustrative process 450 for an illustrative transmit power control system, in accordance with one or more example embodiments of the present disclosure.

At block 452, a first station device (e.g., the user device(s) 120 and/or the AP 102 of FIG. 1) may cause to send a link measurement request frame from the first station device to a second station device, wherein the link measurement request frame may include transmit power information indicative of a transmit power used and a maximum transmit power for each transmit chain of the first station device. The link measurement request frame may include an element with a length of two bytes times a number of transmit chains of the first station device, wherein the transmit power information may be included in the element. The link measurement report frame may further include a signal to noise ratio (SNR) and a modulation and coding scheme (MCS) for each transmit chain.

At block 454, the first station device may identify a link measurement report frame from the second station device in response to the link measurement request frame, wherein the link measurement report frame may indicate a transmit power control (TPC) action to be performed by the first station device for each transmit chain. The first station device may determine that the link measurement report frame includes multiple input, multiple output (MIMO) TPC-related information based on a field in the link measurement report.

At block 456, the first station device may determine whether to perform the TPC action for each transmit chain. The determining whether to perform the TPC action for each transmit chain may be based at least in part on the SNR and the MCS. Based on determining to perform the TPC action, the first station device may perform one or more of: modifying a transmit power of a transmit chain or modifying a MCS of the transmit chain.

At block 458, the first station device may cause to send an acknowledgement to the second station device. The acknowledgement may include a field with a length equal to a number of space-time streams, wherein the field includes a value that indicates an activity performed by the first station device for each space-time stream.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a transmit power control device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600.

In an example, one or any combination of the hardware processor 602, the main memory 604, the static memory 606, or the storage device 616 may constitute machine-readable media.

The transmit power control device 619 may define new signaling required to support TPC for MIMO transmissions in IEEE 802.11ay. The transmit power control system may include the signaling required for both the request and response of MIMO TPC-related information, as well as to acknowledge TPC operations.

The transmit power control device 619 may modify the action field of the Link Measurement Request frame. For example, a modified Link Measurement Request frame may include a new element, such as a DMG Link Measurement Request element. The DMG Link Measurement Request element may have a length of 2 bytes times a number of transmit chains. The DMG Link Measurement Request element may be used to indicate the transmit power used and the maximum transmit power of each transmit chain. This element may be repeated once for each transmit chain.

The transmit power control device 619 may modify the DMG Link Margin element of the Link Measurement Report frame. One or more aspects of the transmit power control system may be based on appropriate extensions to existing signaling, including the directional multi-gigabit (DMG) Link Margin element. For example, the definition of the Rate Adaptation Control field of the DMG Link Margin element may be modified by adding a bit used to indicate that the DMG Link Margin element includes MIMO TPC-related information.

The transmit power control device 619 may include a DMG Link Margin element with a new field added that may be used to report SNR and MCS per space-time stream. For example, the new field within the DMG Link Margin element may be termed "MIMO TPC" and may have a length of bytes times a number of space-time streams in the MIMO transmission. The MIMO TPC field may be repeated for each space-time stream. The MIMO TPC field may allow for a STA to report the link margin and activity of each space-time stream.

The transmit power control device 619 may include a MIMO TPC Link Adaptation Acknowledgement field in a DMG Link Adaptation Acknowledgement element. The DMG Link Adaptation Acknowledgement element may include a number of MIMO TPC Link Adaptation Acknowledgement fields that is equal to a number of space-time streams.

The transmit power control device 619 may carry out or perform any of the operations and processes (e.g., processes 400 and/or 450) described and shown above.

It is understood that the above are only a subset of what the transmit power control device 619 may be configured to perform and that other functions included throughout this disclosure may also be performed by the transmit power control device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., IEEE 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a MIMO transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device, the device comprising processing circuitry coupled to storage, the processing circuitry configured to: identify a link measurement request frame received from a first station device; determine, for each transmit chain of the first station device, a transmit power control (TPC) action to be performed by the first device; cause to send a link measurement report frame comprising a value indicative of the TPC action for each transmit chain; and identify an acknowledgement received from the first station device.

Example 2 may include the device of example 1 and/or some other example herein, wherein the TPC action includes a modification of a transmit power for the transmit chain or a modification of a modulation and coding scheme (MCS) for each transmit chain.

Example 3 may include the device of example 1 and/or some other example herein, wherein the storage and processing circuitry are further configured to determine a signal to noise ratio (SNR) for each transmit chain, and wherein the link measurement report frame further comprises a value indicative of the SNR for each transmit chain.

Example 4 may include the device of example 1 and/or some other example herein, wherein the link measurement report frame includes a field with a length equal to two bytes times a number of space-time streams, and wherein the value indicative of the TPC action for each transmit chain is included in the field.

Example 5 may include the device of example 1 and/or some other example herein, wherein the acknowledgement includes a value that indicates whether the first station device performed the TPC action for each transmit chain.

Example 6 may include the device of example 1 and/or some other example herein, wherein the link measurement report includes a field that indicates that a directional multi-gigabit (DMG) Link Margin element of the link measurement report includes multiple input, multiple output (MIMO) TPC-related information.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver.

Example 9 may include a non-transitory computer-readable medium storing computer-executable instructions which when executed by one or more processors result in performing operations comprising: causing to send a link measurement request frame from a first station device to a second station device, wherein the link measurement request frame includes transmit power information indicative of a transmit power used and a maximum transmit power for each transmit chain of the first station device; identifying a link measurement report frame received from the second station device in response to the link measurement request frame, wherein the link measurement report frame indicates a transmit power control (TPC) action to be performed by the first station device for each transmit chain; determining whether to perform the TPC action for each transmit chain; and causing to send an acknowledgement to the second station device.

Example 10 may include the non-transitory computer-readable medium of example 9 and/or some other example herein, wherein the link measurement request frame includes an element with a length of two bytes times a number of transmit chains of the first station device, and wherein the transmit power information is included in the element.

Example 11 may include the non-transitory computer-readable medium of example 9 and/or some other example herein, wherein the link measurement report frame further includes a signal to noise ratio (SNR) and a modulation and coding scheme (MCS) for each transmit chain, and wherein the determining whether to perform the TPC action for each transmit chain is based at least in part on the SNR and the MCS.

Example 12 may include the non-transitory computer-readable medium of example 9 and/or some other example herein, further comprising determining that the link measurement report frame includes multiple input, multiple output (MIMO) TPC-related information based on a field in the link measurement report.

Example 13 may include the non-transitory computer-readable medium of example 9 and/or some other example herein, wherein the acknowledgement includes a field with a field with a length equal to a number of space-time streams, wherein the field includes a value that indicates an activity performed by the first station device for each space-time stream.

Example 14 may include the non-transitory computer-readable medium of example 9 and/or some other example herein, further comprising: based on determining to perform the TPC action, performing one or more of: modifying a transmit power of a transmit chain or modifying a MCS of the transmit chain.

Example 15 may include a method comprising: identifying, by one or more processors, a link measurement request frame received from a first station device; determining, by the one or more processors, a transmit power control (TPC) action to be performed by the first station device for each transmit chain of the first station device; causing to send, by the one or more processors, a link measurement report frame comprising a value indicative of the TPC action for each transmit chain; and identifying, by the one or more processors, an acknowledgement received from the first station device.

Example 16 may include the method of example 15 and/or some other example herein, wherein the TPC action includes a modification of a transmit power for the transmit chain or a modification of a modulation and coding scheme (MCS) for each transmit chain.

Example 17 may include the method of example 15 and/or some other example herein, wherein the storage and processing circuitry are further configured to determine a signal to noise ratio (SNR) for each transmit chain, and wherein the link measurement report frame further comprises a value indicative of the SNR for each transmit chain.

Example 18 may include the method of example 15 and/or some other example herein, wherein the link measurement report frame includes a field with a length equal to two bytes times a number of space-time streams, and wherein the value indicative of the TPC action for each transmit chain is included in the field.

Example 19 may include the method of example 15 and/or some other example herein, wherein the acknowledgement includes a value that indicates whether the first station device performed the TPC action for each transmit chain.

Example 20 may include the method of example 15 and/or some other example herein, wherein the link measurement report includes a field that indicates that a directional multi-gigabit (DMG) Link Margin element of the link measurement report includes multiple input, multiple output (MIMO) TPC-related information.

Example 21 may include an apparatus comprising means for: identifying a link measurement request frame received from a first station device; determining, for each transmit chain of the first station device, a transmit power control (TPC) action to be performed by the first device; causing to send a link measurement report frame comprising a value indicative of the TPC action for each transmit chain; and identifying an acknowledgement received from the first station device.

Example 22 may include the apparatus of example 21 and/or some other example herein, wherein the TPC action includes a modification of a transmit power for the transmit chain or a modification of a modulation and coding scheme (MCS) for each transmit chain.

Example 23 may include the apparatus of example 21 and/or some other example herein, further comprising means for determining a signal to noise ratio (SNR) for each transmit chain, wherein the link measurement report frame further comprises a value indicative of the SNR for each transmit chain.

Example 24 may include the apparatus of example 21 and/or some other example herein, wherein the link measurement report frame includes a field with a length equal to two bytes times a number of space-time streams, and wherein the value indicative of the TPC action for each transmit chain is included in the field.

Example 25 may include the apparatus of example 21 and/or some other example herein, wherein the acknowledgement includes a value that indicates whether the first station device performed the TPC action for each transmit chain.

Example 26 may include the apparatus of example 21 and/or some other example herein, wherein the link measurement report includes a field that indicates that a directional multi-gigabit (DMG) Link Margin element of the link measurement report includes multiple input, multiple output (MIMO) TPC-related information.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
identify a link measurement request frame received from a first station device, wherein the link measurement request frame request is to obtain link margin information to determine an appropriate transmit power control (TPC) action by the first station device on a per transmit chain of the first station device;
generate a link measurement report frame comprising a value indicative of the TPC action for each transmit chain, a directional multi-gigabit (DMG) Link Margin element that comprises at least in part a rate adaptation control field, and wherein the rate adaptation control field comprises first bits that indicate a number of chains, second bits that indicate a number of space-times streams, one or more third bits indicating physical layer protocol data unit (PPDU) information, and one or more fourth bits indicating low-density parity-check (LDPC) information;
send the link measurement report frame in response to the link measurement request frame to the first station device; and
identify an acknowledgement frame comprising a DMG link adaptation acknowledgment element received from the first station device, wherein the acknowledgment frame comprises an activity field.

2. The device of claim 1, wherein the link measurement report frame comprises a recommend activity for the first station device to implement.

3. The device of claim 2, wherein an activity field of the acknowledgment frame is set to a recommended action that the first station device has executed following the reception of the recommended activity in the link measurement report frame.

4. The device of claim 1, wherein the DMG link margin element further comprises an element ID field, a length field, an activity field, an modulation and coding scheme (MCS) field, a link margin field, a signal to noise ratio (SNR) field, and a reference timestamp field.

5. The device of claim 1, wherein the TPC action includes a modification of a transmit power for the transmit chain or a modification of a modulation and coding scheme (MCS) for each transmit chain.

6. The device of claim 1, wherein the processing circuitry is further configured to determine a signal to noise ratio (SNR) for each space-time stream, and wherein the link measurement report frame further comprises a value indicative of the SNR for each space-time stream.

7. The device of claim 1, wherein the DMG link margin element comprises a TPC field, wherein the TPC field is based on the number of space-time streams.

8. The device of claim 1, wherein the acknowledgement includes a value that indicates whether the first station device performed the TPC action for each transmit chain.

9. A non-transitory computer-readable medium storing computer-executable instructions which when executed by one or more processors result in performing operations comprising:
identifying a link measurement request frame received from a first station device, wherein the link measurement request frame request is to obtain link margin information to determine an appropriate transmit power control (TPC) action by the first station device on a per transmit chain of the first station device;
generating a link measurement report frame comprising a value indicative of the TPC action for each transmit chain, a directional multi-gigabit (DMG) Link Margin element that comprises at least in part a rate adaptation control field, and wherein the rate adaptation control field comprises first bits that indicate a number of chains, second bits that indicate a number of space-times streams, one or more third bits indicating physical layer protocol data unit (PPDU) information, and one or more fourth bits indicating low-density parity-check (LDPC) information;
sending the link measurement report frame in response to the link measurement request frame to the first station device; and
identifying an acknowledgement frame comprising a DMG link adaptation acknowledgment element received from the first station device, wherein the acknowledgment frame comprises an activity field.

10. The non-transitory computer-readable medium of claim 9, wherein the link measurement report frame comprises a recommend activity for the first station device to implement.

11. The non-transitory computer-readable medium of claim 10, wherein an activity field of the acknowledgment frame is set to a recommended action that the first station device has executed following the reception of the recommended activity in the link measurement report frame.

12. The non-transitory computer-readable medium of claim 9, wherein the DMG link margin element further comprises an element ID field, a length field, an activity field, an modulation and coding scheme (MCS) field, a link margin field, a signal to noise ratio (SNR) field, and a reference timestamp field.

13. The non-transitory computer-readable medium of claim 9, wherein the TPC action includes a modification of a transmit power for the transmit chain or a modification of a modulation and coding scheme (MCS) for each transmit chain.

14. The non-transitory computer-readable medium of claim 9, wherein the operations further comprise determining a signal to noise ratio (SNR) for each space-time stream, and wherein the link measurement report frame further comprises a value indicative of the SNR for each space-time stream.

15. The non-transitory computer-readable medium of claim 9, wherein the DMG link margin element comprises a TPC field, wherein the TPC field is based on the number of space-time streams.

16. The non-transitory computer-readable medium of claim 9, wherein the acknowledgement includes a value that indicates whether the first station device performed the TPC action for each transmit chain.

17. A method comprising:
identifying a link measurement request frame received from a first station device, wherein the link measurement request frame request is to obtain link margin information to determine an appropriate transmit power control (TPC) action by the first station device on a per transmit chain of the first station device;
generating a link measurement report frame comprising a value indicative of the TPC action for each transmit chain, a directional multi-gigabit (DMG) Link Margin element that comprises at least in part a rate adaptation control field, and wherein the rate adaptation control field comprises first bits that indicate a number of chains, second bits that indicate a number of space-times streams, one or more third bits indicating physical layer protocol data unit (PPDU) information, and one or more fourth bits indicating low-density parity-check (LDPC) information;

sending the link measurement report frame in response to the link measurement request frame to the first station device; and identifying an acknowledgement frame comprising a DMG link adaptation acknowledgment element received from the first station device, wherein the acknowledgment frame comprises an activity field.

18. The method of claim 17, wherein the link measurement report frame comprises a recommend activity for the first station device to implement.

19. The method of claim 18, wherein an activity field of the acknowledgment frame is set to a recommended action that the first station device has executed following the reception of the recommended activity in the link measurement report frame.

20. The method of claim 17, wherein the DMG link margin element further comprises an element ID field, a length field, an activity field, an modulation and coding scheme (MCS) field, a link margin field, a signal to noise ratio (SNR) field, and a reference timestamp field.

* * * * *